US012665716B2

(12) United States Patent
Manolakos et al.

(10) Patent No.: US 12,665,716 B2
(45) Date of Patent: Jun. 23, 2026

(54) TECHNIQUES FOR GROUP COMMON REFERENCE SIGNAL TRIGGERING IN WIRELESS COMMUNICATIONS

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 18/013,130

(22) PCT Filed: Aug. 13, 2021

(86) PCT No.: PCT/US2021/045970
§ 371 (c)(1),
(2) Date: Dec. 27, 2022

(87) PCT Pub. No.: WO2022/046439
PCT Pub. Date: Mar. 3, 2022

(65) Prior Publication Data
US 2023/0239106 A1 Jul. 27, 2023

(30) Foreign Application Priority Data
Aug. 24, 2020 (GR) ............................... 20200100508

(51) Int. Cl.
*H04L 5/00* (2006.01)

(52) U.S. Cl.
CPC ............ *H04L 5/0051* (2013.01); *H04L 5/001* (2013.01); *H04L 5/0035* (2013.01)

(58) Field of Classification Search
None
See application file for complete search history.

(56) References Cited

U.S. PATENT DOCUMENTS

| 2018/0317213 A1* | 11/2018 | Islam | ..................... H04L 1/1614 |
| 2019/0132824 A1* | 5/2019 | Jeon | ....................... H04L 5/0098 |
| 2019/0273637 A1* | 9/2019 | Zhang | ................... H04L 5/0051 |
| 2020/0037305 A1 | 1/2020 | Yang et al. | |

(Continued)

OTHER PUBLICATIONS

International Search Report and Written Opinion—PCT/US2021/045970—ISA/EPO—Nov. 26, 2021.

(Continued)

*Primary Examiner* — Diane L Lo
(74) *Attorney, Agent, or Firm* — ArentFox Schiff, LLP

(57) ABSTRACT

Some aspects described herein relate to receiving, from a network via at least one of multiple transmission/reception points (TRPs), a group common (GC)-downlink control information (DCI) in a first component carrier (CC) that includes a set of blocks intended for one or more UEs, and receiving, based at least in part on the GC-DCI and a subset of the set of blocks that are intended for the UE, one or more downlink reference signals of multiple downlink reference signals over resources in a second CC, where the one or more downlink reference signals are associated with each block of the subset of the set of blocks. Other aspects relate to transmitting the GC-DCI and the one or more downlink reference signals.

31 Claims, 6 Drawing Sheets

(56)         References Cited

U.S. PATENT DOCUMENTS

2020/0259625 A1*   8/2020   Papasakellariou ...   H04B 7/0456
2021/0051759 A1*   2/2021   Zhou ................   H04W 52/0206

OTHER PUBLICATIONS

Samsung: "Functionalities of UE-Common PDCCH", 3GPP TSG
RAN WG1 NR ad-Hoc#2, 3GPP Draft, R1-1710698 GC-PDCCH
Contents, 3rd Generation Partnership Project (3GPP), Mobile Com-
petence Centre, 650, Route Des Lucioles, F-06921 Sophia-Antipolis
Cedex, France, vol. RAN WG1, No. Qingdao, China, Jun. 27,
2017-Jun. 30, 2017, pp. 1-5. Jun. 17, 2017 (Jun. 17, 2017),
XP051305179, Section 2.2.
Samsung: "Functionalities of UE-Common PDCCH", 3GPP TSG
RAN WG1 NR ad-Hoc#2, R1-1710698, Qingdao, China, Jun.
27-30, 2017, Jun. 17, 2017, pp. 1-5, Section 1-2.

* cited by examiner

400

500

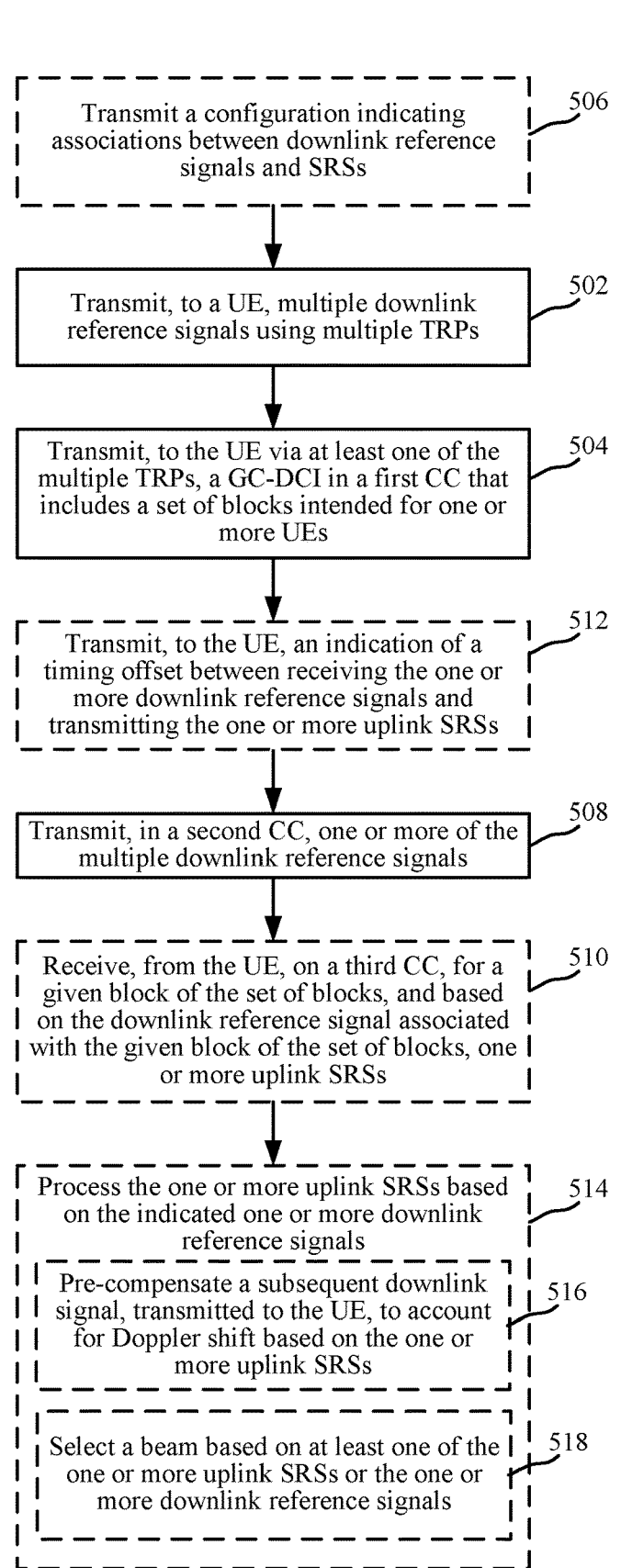

Transmit a configuration indicating associations between downlink reference signals and SRSs    506

Transmit, to a UE, multiple downlink reference signals using multiple TRPs    502

Transmit, to the UE via at least one of the multiple TRPs, a GC-DCI in a first CC that includes a set of blocks intended for one or more UEs    504

Transmit, to the UE, an indication of a timing offset between receiving the one or more downlink reference signals and transmitting the one or more uplink SRSs    512

Transmit, in a second CC, one or more of the multiple downlink reference signals    508

Receive, from the UE, on a third CC, for a given block of the set of blocks, and based on the downlink reference signal associated with the given block of the set of blocks, one or more uplink SRSs    510

Process the one or more uplink SRSs based on the indicated one or more downlink reference signals    514

Pre-compensate a subsequent downlink signal, transmitted to the UE, to account for Doppler shift based on the one or more uplink SRSs    516

Select a beam based on at least one of the one or more uplink SRSs or the one or more downlink reference signals    518

FIG. 5

TECHNIQUES FOR GROUP COMMON REFERENCE SIGNAL TRIGGERING IN WIRELESS COMMUNICATIONS

CLAIM OF PRIORITY

The present Application Patent is a 35 U.S.C. § 371 National Phase Application of PCT Patent Application No. PCT/US2021/045970 filed Aug. 13, 2021, entitled "TECHNIQUES FOR GROUP COMMON REFERENCE SIGNAL TRIGGERING IN WIRELESS COMMUNICATIONS," which claims priority to Greek patent application No. 20200100508, entitled "TECHNIQUES FOR GROUP COMMON REFERENCE SIGNAL TRIGGERING IN WIRELESS COMMUNICATIONS" filed Aug. 24, 2020, which are assigned to the assignee hereof and hereby expressly incorporated by reference herein for all purposes.

BACKGROUND

Aspects of the present disclosure relate generally to wireless communication systems, and more particularly, to transmitting and processing reference signals from multiple transmission/reception points (TRP).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some applications include high-speed train (HST) scenarios where a network can use multiple TRPs to transmit signals to user equipment (UE) aboard a HST in a single frequency network (SFN). As the HST passes among coverage areas provided by multiple TRPs, the UE can receive downlink signals from, and/or transmit uplink signals to, different ones of the multiple TRPs in the SFN for communicating in a wireless network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to receive, from a network via at least one of multiple transmission/reception points (TRPs), a group common (GC)-downlink control information (DCI) in a first component carrier (CC) that includes a set of blocks intended for one or more UEs, and receive, based at least in part on the GC-DCI and a subset of the set of blocks that are intended for the UE, one or more downlink reference signals of multiple downlink reference signals over resources in a second CC, wherein the one or more downlink reference signals are associated with each block of the subset of the set of blocks.

According to another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit, to a UE, multiple downlink reference signals using multiple TRPs, transmit, to the UE via at least one of the multiple TRPs, a GC-DCI in a first CC that includes a set of blocks for a group of multiple UEs, wherein a downlink reference signal of the multiple downlink reference signals is associated with a given block of the set of blocks, and transmit, in a second CC, one or more of the multiple downlink reference signals.

In another aspect, a method for wireless communications by a UE is provided that includes receiving, from a network via at least one of multiple TRPs, a GC-DCI in a first CC that includes a set of blocks intended for one or more UEs, and receiving, based at least in part on the GC-DCI and a subset of the set of blocks that are intended for the UE, one or more downlink reference signals of multiple downlink reference signals over resources in a second CC, wherein the one or more downlink reference signals are associated with each block of the subset of the set of blocks.

In another aspect, a method for wireless communications is provided that includes transmitting, to a UE, multiple downlink reference signals using multiple TRPs, transmitting, to the UE via at least one of the multiple TRPs, a GC-DCI in a first CC that includes a set of blocks for a group of multiple UEs, wherein a downlink reference signal of the multiple downlink reference signals is associated with a given block of the set of blocks, and transmitting, in a second CC, one or more of the multiple downlink reference signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is a flow chart illustrating an example of a method for generating a group common configuration indicating downlink reference signals, in accordance with various aspects of the present disclosure.

DETAILED DESCRIPTION

Figure 1:
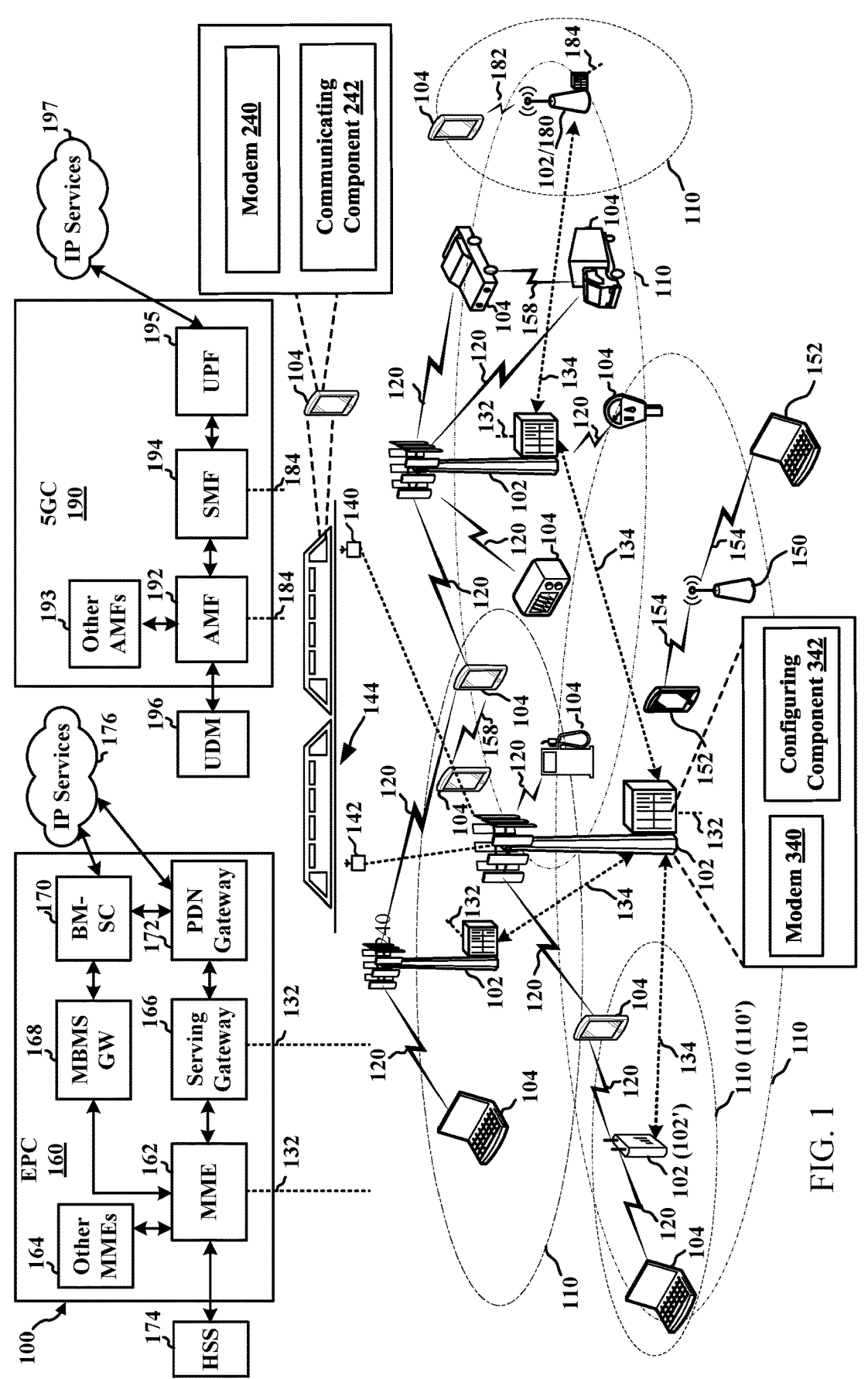
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining one or more reference signals to receive from one or more transmission/reception points (TRPs) based on which to transmit one or more uplink signal to the one or more TRPs. A user equipment (UE) communicating in a wireless network can receive multiple reference signals from multiple TRPs in a single frequency network (SFN) in a similar time period. For example, the UE may receive the multiple reference signals in the similar time period as the TRPs can be used to transmit the same or similar communications from the wireless network. For example, in a high speed train (HST) scenario, a UE aboard a HST can move in and out of coverage of various TRPs, and can receive signals from the various TRPs, which may include receiving multiple signals from multiple TRPs, where the multiple signals may at least partially overlap in time. The signals may include downlink channels, such as physical downlink control channel (PDCCH), physical downlink shared channel (PDSCH), etc. In an example, multiple quasi-colocation (QCL) assumptions (e.g., transmission configuration indicator (TCI) states) can be configured for demodulation reference signals of PDSCH and PDCCH. For example, the UE can use the indicated QCL reference signal resources (e.g., channel state information reference signal (CSI-RS) or tracking reference signal (TRS), or synchronization signal block (SSB), etc.) to know or estimate the Doppler shift of each TRP and/or to determine a receive (Rx) beam to use in receiving signals from each of the TRPs. The UE can also transmit an uplink signal to the one or more TRPs that is transmitted or modulated based on one or more of the downlink reference signals.

In one example, e.g., in HST scenarios, nearby UEs can be considered to be part of a cluster of UEs that experience channel with similarly high Doppler shift. The Doppler shifts that this cluster of UEs experiences may change "non-uniformly" across time. For example, the rate in Doppler frequency change can be at its highest during a period of time when a train passes by a TRP, because at this time the train has the highest rate of displacement with respect to the TRP.

In an example, the network can transmit a group common (GC)-downlink control information (DCI) to a set of multiple UEs, where the set of multiple UEs can include multiple such clusters of UEs. In an example, the GC-DCI can include a set of blocks, where each block can include one or more bits that selects one of multiple configured downlink reference signals for a given UE or group of UEs. A UE can accordingly receive the DCI and can determine the downlink reference signal configured to the UE or its corresponding group of UEs. The UE can then receive the downlink reference signal and transmit an uplink signal based on the downlink reference signal. In another example, an aperiodic sounding reference signal (A-SRS) can be indicated for each of the multiple downlink reference signals, and the UE can accordingly transmit, e.g., as the uplink signal or otherwise, the A-SRS associated with the downlink reference signal. In one example, the UE can determine the A-SRS based on the same configuration (e.g., where other blocks can be used to indicate A-SRS associated with the downlink reference signal, or a single block can indicate both downlink reference signal and A-SRS). In another example, the UE can determine the A-SRS based on a different configuration received from the network that associates downlink reference signals with A-SRSs, etc.

In this regard, UEs that are near one another, and thus likely experiencing similar Doppler shift, can use the same downlink reference signal to generate and transmit an uplink signal (e.g., SRS). The network can process the received uplink signal to modify subsequent communications with the UEs in the group. For example, the network can use the uplink signal to determine transmit or receive beams for or with the UEs. In another example, the network can use the uplink signal to pre-compensate subsequent downlink signals for the experienced Doppler shift. For example, the pre-compensation can be performed by the network based on an uplink signal received from the UE, such as a sounding reference signal (SRS). In any case, configuring a group of UEs to use the same downlink reference signal (or set of downlink reference signals) for transmitting corresponding uplink signaling can allow for more efficient and improved pre-compensating of signals transmitted by the TRPs to UEs based on proximity of the UEs to the TRPs.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system 100 and an access network. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining one or more of multiple downlink reference signals based on which to transmit or modulate one or more uplink signals, in accordance with aspects described herein. In addition, some nodes may have a modem 340 and configuring component 342 for configuring multiple downlink reference signals in a group common configuration for indicating and transmitting to a UE 104, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In aspects of the wireless communication system 100, a base station 102 may also include one or more remotely located TRPs 140, 142, which may be wired or wirelessly coupled with the base station 102 for transmitting/receiving associated signaling from/to the base station 102 at a different location. The TRPs 140, 142 may operate based on a SFN to transmit signals in the same frequency range. In an example, TRPs 140, 142 may be remote radio heads (RRHs), relays, etc. configured to facilitate communications between one or more UEs, or other devices, and base station 102. In another example, TRPs 140, 142 may include one or more small cells in communication with core network 160/190 to facilitate wireless communications between the core network 160/190 and one or more UEs. In a specific example, the TRPs 140, 142 may be positioned in an HST system to allow UEs 104 aboard a HST 144 to communicate with core network 160/190 using the TRPs 140, 142 (e.g., as RRHs or relays to base station 102 or otherwise).

In an example, communicating component 242 can receive multiple RSs from multiple TRPs 140, 142 (e.g., at a given point in time or over similar time periods) in a SFN. Communicating component 242 can also receive (e.g., from configuring component 342) a group common configuration from the bae station 102 or multiple TRPs 140, 142, which indicates one or more parameters for allowing the UE 104 to determine one or more of the multiple reference signals to receive, based on which to transmit an uplink signal, such as an SRS, etc. Communicating component 242 can accordingly receive the reference signal and/or accordingly transmit the uplink signal based on the determined one or more of the multiple reference signals, as received. In another example, the group common configuration or another configuration can also indicate one or more parameters for transmitting the uplink signal (e.g., as a A-SRS), and communicating component 242 can accordingly transmit the uplink signal based on the one or more parameters.

Figure 2:
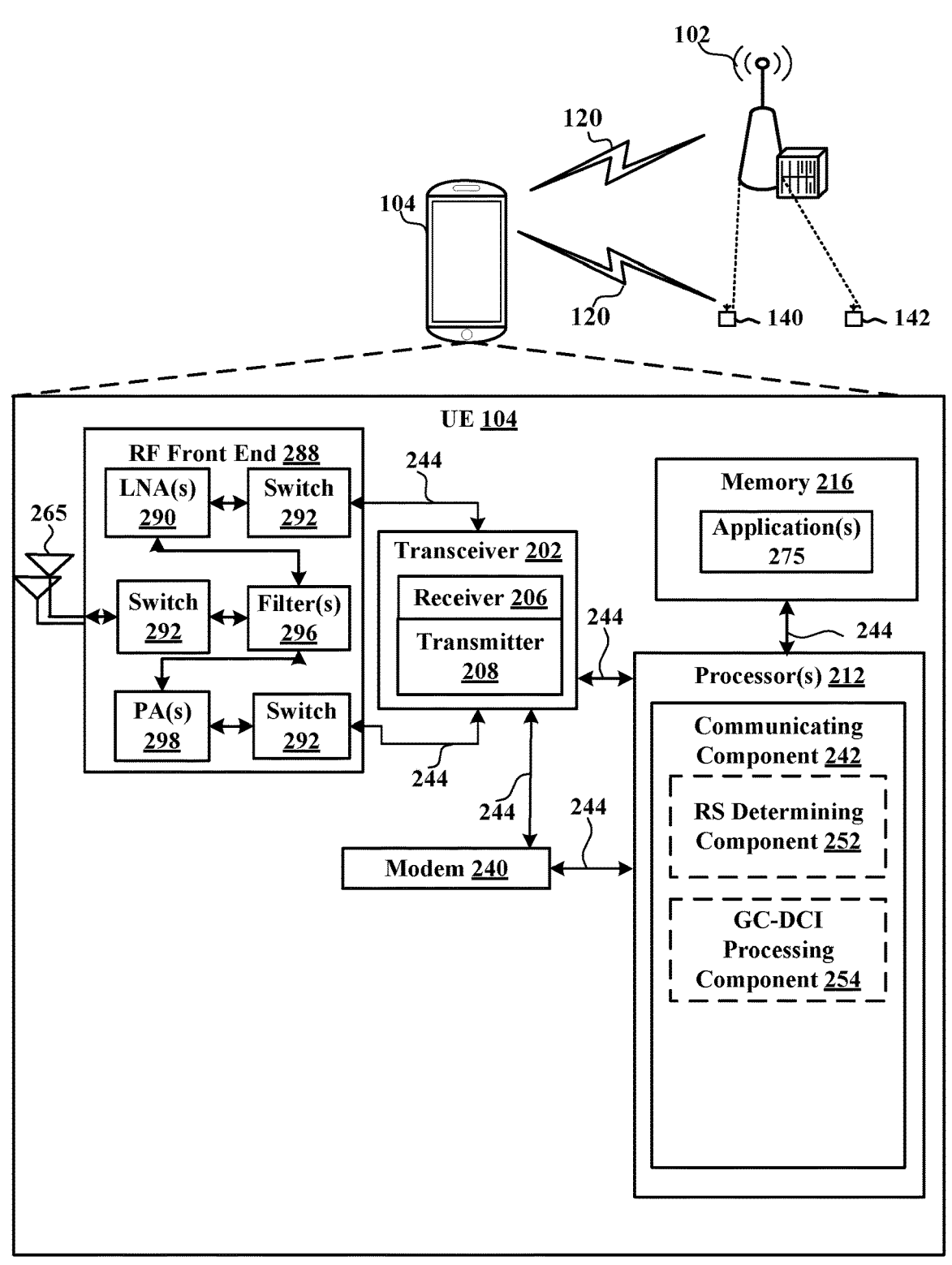
FIG. 2 is a block diagram illustrating an example of a UE, in accordance with various aspects of the present disclosure.
Figure 3:
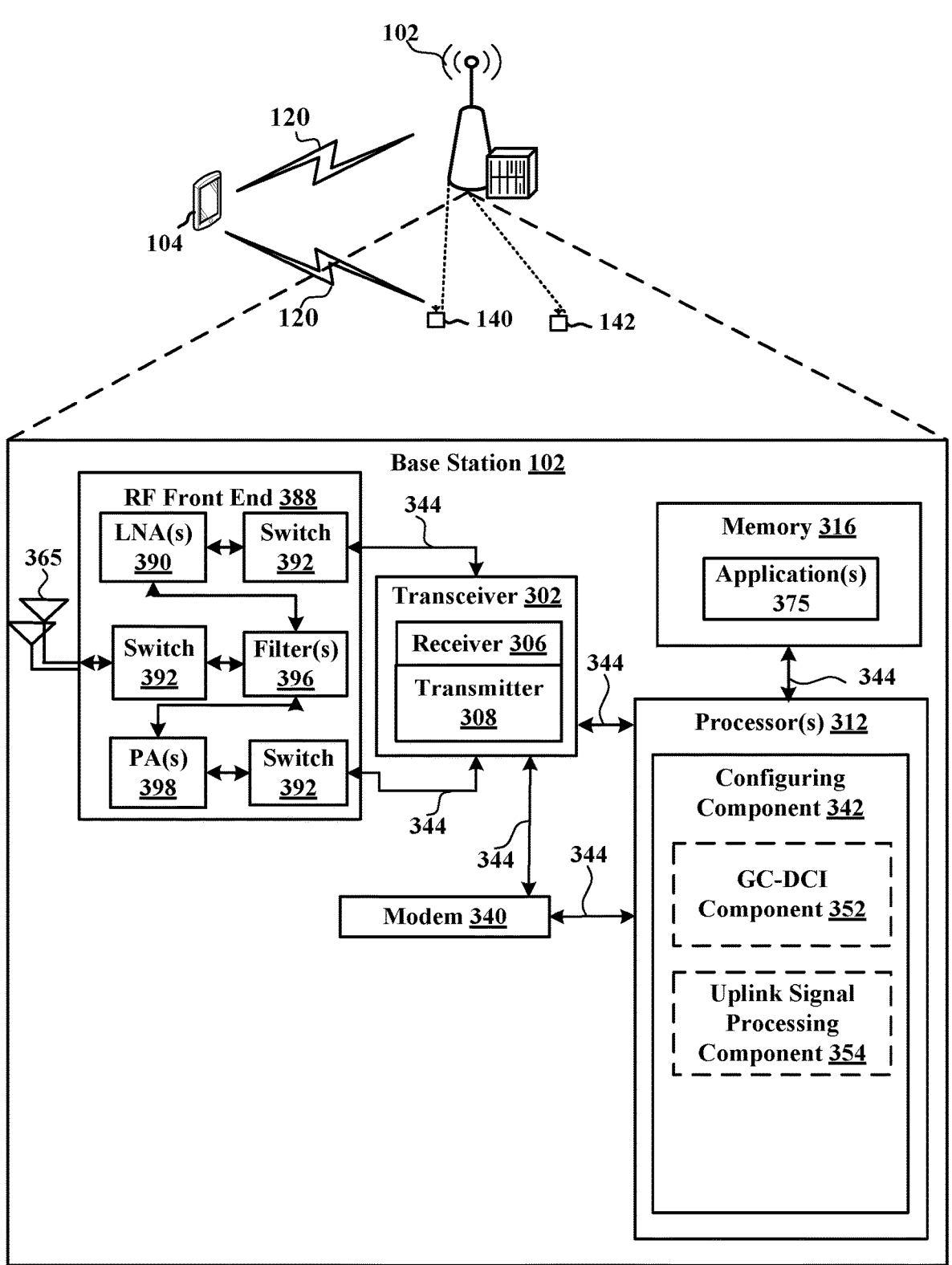
FIG. 3 is a block diagram illustrating an example of a base station, in accordance with various aspects of the present disclosure.
Figure 4:
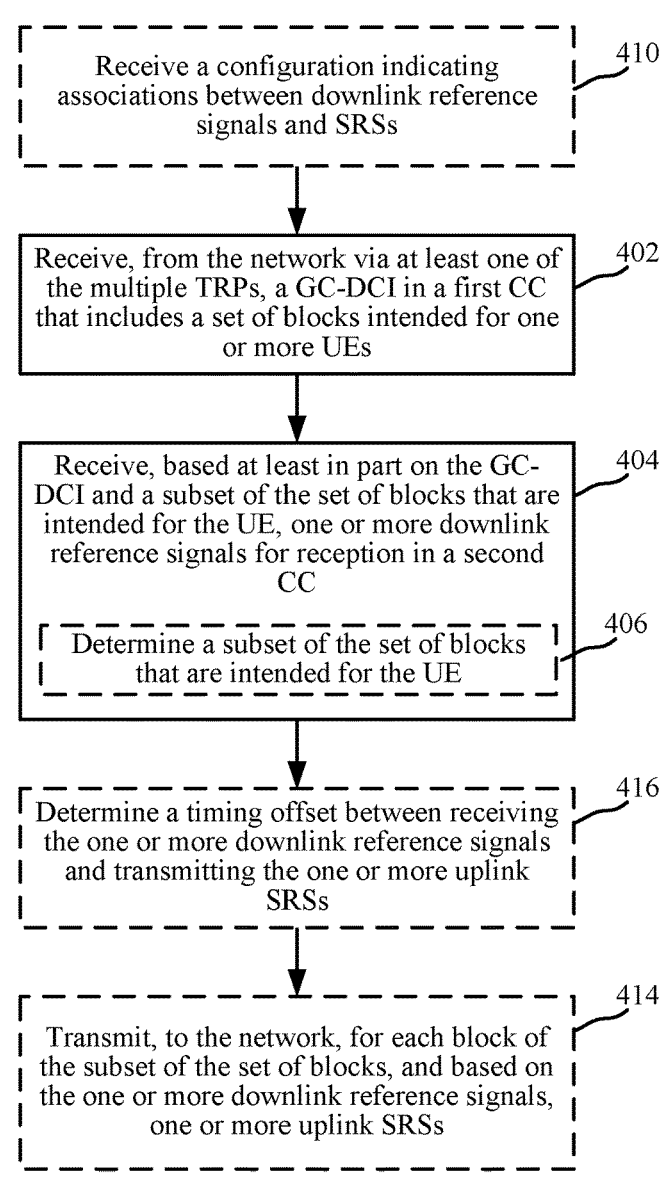
FIG. 4 is a flow chart illustrating an example of a method for receiving a group common configuration indicating downlink reference signals, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining one of multiple downlink reference signals based on which to transmit or modulate an uplink signal, in accordance with aspects described herein. Moreover, the UE 104 can communicate with a base station 102 via communication links 120 (e.g., to access a network, such as a EPC 160, 5GC 190, etc.). Additionally, as described, the base station 102 can be connected to one or more TRPs, such as TRPs 140, 142, which may be a RRH, relay, etc. used to forward signals transmitted by the base station 102 to one or more UEs 104 and/or forward signals transmitted by the one or more UEs 104 to the base station 102. In one example, the base station 102 can provide the one or more TRPs 140, 142 to enable communications in a HST scenario.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a RS determining component 252 for determining multiple RSs received from multiple TRPs 140, 142, and/or a GC-DCI processing component 254 for processing a group common configuration (e.g., a GC-DCI) to determine one or more of multiple reference signals to be received by the UE 104 and/or based on which to transmit an uplink signal, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring multiple downlink reference signals in a group common configuration for indicating and transmitting to a UE 104, in accordance with aspects described herein. Additionally, as described, the base station 102 can be connected to one or more TRPs 140, 142, which may be a RRH, relay, etc. used to forward signals transmitted by the base station 102 to one or more UEs 104 and/or forward signals transmitted by the one or more UEs 104 to the base station 102.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a GC-DCI component 352 for generating a group common configuration (e.g., a GC-DCI) for multiple UEs to indicate one or more of multiple downlink reference signals the UEs can use to transmit uplink signals to the base station 102 and/or one or more TRPs 140, 142, and/or an uplink signal processing component 354 for processing one or more uplink signals received from the UE 104 based on which of the multiple RSs the uplink signal is transmitted or modulated, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

Aspects described herein may relate to functionality defined in 5G NR, such as configuration and transmission of uplink SRSs. For example, a UE can transmit a sounding reference signal (SRS) based on a configuration from the network (e.g., received via one or more TRPs). For example, in 5G NR, an SRS resource set can include sets of SRS resources over which an SRS can be transmitted by one UE. For example, the SRS resources, or resources more generally, can correspond to a collection of resource blocks (RBs), where the RBs can be defined in frequency over a period of time. For example, RBs can include a number of subcarriers (e.g., 12 frequency subcarriers) over a period of time, such as a symbol (e.g., an orthogonal frequency division multiplexing (OFDM) symbol, single carrier-frequency division multiplexing (SC-FDM) symbol etc. In another example, the SRS resources can include multiple resource blocks or other divisions of frequency and/or time, which can be indicated over a larger period of time, such as a slot of multiple symbols, multiple slots, etc.

In one example in 5G NR, an SRS resource set may be configured for transmitting aperiodic SRS (e.g., as signaled in downlink control information (DCI)), semi-persistent SRS, periodic SRS, etc. For example, a UE may be configured with multiple sets resources for transmitting SRS, which may be grouped in an SRS resource set depending on the use case. For example, a set of SRS resources can be separately configured for each of antenna switching, codebook-based, non-codebook based, beam management, etc. For A-SRS transmission, 2 bits in the downlink (DL) or uplink (UL) DCI can be used to trigger the transmission of an SRS resource set. Each A-SRS resource set can be tagged with either 1, or 2, or 3, corresponding to codepoint 01, 10, 11. DCI codepoint 00 can indicate no A-SRS transmission. Each A-SRS set can be configured in radio resource control (RRC), which may include an indication of RBs over which SRS A-SRS is to be transmitted and/or one or more other time-related parameters, such as a "slotOffset" from 0 . . . 32, where the slotOffset can correspond to an offset in number of slots between the triggering DCI and the actual transmission of this SRS-ResourceSet. If the field is absent the UE can apply no offset (value 0). Once the SRS resource set is selected by DCI, the slot offset can be fixed. The UE may determine the resources for transmitting A-SRS based on the codepoint specified in the DCI and the mapping between the codepoint and resource information specified in RRC signaling.

In 5G NR, a DCI format, such as DCI 2_3, can be used for the transmission, to one or more UEs, of a group of transmit power control (TPC) commands for SRS transmissions by the one or more UEs. Along with a TPC command, SRS request may also be transmitted. The contents of the DCI format 2_3 can include multiple blocks: block1, block2, . . . blockB. For a Type-A, UE is configured with one block which applies a CC set and includes SRS request (0,2 bits) to determine the CC set, and N TPC command for each CC in the set. For a Type-B, UE is configured with one or more blocks, where each block applies to one UL carrier and includes SRS request (0,2 bits) to determine the SRS resource set(s), and TPC command (2 bit). A similar concept can be used to configure the multiple downlink reference signals, as described herein. For example, this can include using the DCI 2_3 format to indicate the SRS resource set(s), which may be associated with TRS resource set(s) in another configuration. In another example, DCI 2_3 format can be extended to indicate TRS resource set(s), or associated codepoints, as well (e.g., as another parameter). In yet another example, the similar concept of DCI 2_3 format can be used to provide similar blocks for defining TRS resource set(s), as described further herein.

In an example, 2 bits in the DL or UL DCI can be used to trigger A-SRS. For example, each A-SRS set can be tagged with either 1, or 2, or 3, each A-SRS set can be configured in RRC with a "slotOffset" from 0 . . . 32, as described. Each SRS resource of a set has an associated symbol index of the first symbol containing the SRS resource ("startPosition"), and an SRS resource may span multiple consecutive OFDM symbols. Various DCI formats can have various parameters and mechanisms for triggering A-SRS, as defined in 5G NR for DCI formats 0_1, 1_1, and 2_3 (e.g., as in third generation partnership project (3GPP) technical specification (TS) 38.212, sections 7.3.1.1.2, 7.3.1.2.2, and 7.3.1.3.4).

FIG. 4 illustrates a flow chart of an example of a method 400 for determining one or more of multiple reference signals based on which to transmit one or more uplink signals, in accordance with aspects described herein. In an example, a UE 104 can perform the functions described in method 400 using one or more of the components described in FIGS. 1 and 2.

In method 400, at Block 402, a GC-DCI that includes a set of blocks intended for one or more UEs can be received from a network via at least one of multiple TRPs in a first CC. In an aspect, GC-DCI processing component 254, e.g., in conjunction with processor(s) 212, memory 216, transceiver 202, communicating component 242 etc., can receive and/or process, from the network (e.g., from a base station 102 or network component), via at least one of the multiple TRPs, a GC-DCI, in a first CC, that includes a set of blocks intended for one or more UEs. For example, the GC-DCI can include the set of blocks, which can include a configuration of A-TRS only (e.g., each of the set of blocks corresponds to a A-TRS), or configuration of both A-TRS and A-SRS (e.g., each of the set of blocks includes a A-TRS or a corresponding A-SRS, or each block includes an A-TRS and corresponding A-SRS, etc.), as described further herein. Various formats can be used to indicate the blocks and/or related information, as described further herein. Moreover, as described in one example, DCI format 2_3 defined in 5G NR, or a similar mechanism, can indicate the set of blocks that can each have or correspond to an A-TRS configuration and/or A-SRS configuration.

In method 400, at Block 404, one or more downlink reference signals for reception in a second CC can be received based at least in part on the GC-DCI and a subset of the set of blocks that are intended for the UE. In an aspect, RS determining component 252, e.g., in conjunction with processor(s) 212, memory 216, transceiver 202, communicating component 242, etc., can determine, based at least in part on the GC-DCI and the subset of the set of blocks that are intended for the UE, one or more downlink reference signals for reception in a second CC. In one example, the one or more downlink reference signals can include downlink reference signals based on which the UE 104 is to transmit one or more uplink SRSs on a third CC.

In an example, as part of receiving the one or more downlink reference signals at Block 404, optionally at Block 406, a subset of the set of blocks that are intended for the UE can be determined. In an aspect, GC-DCI processing component 254, e.g., in conjunction with processor(s) 212, memory 216, transceiver 202, communicating component 242, etc., can determine the subset of the set of blocks that are intended for the UE. For example, GC-DCI processing component 254 can determine a subset of the set of blocks that are associated with at least one of a group identifier for a group of which the UE is a part, an associated UE identifier, and/or the like. In an example, the UE 104 can be configured with a specific radio network temporary identifier (RNTI), which the UE 104 can use to descramble the GC-DCI that is intended for the UE 104. The UE 104 can be configured with a pointer that indicates which block of the GC-DCI is intended for this UE 104.

For example, as described, RS determining component 252, e.g., via communicating component 242, can receive the multiple downlink reference signals transmitted by the network via the multiple TRPs. For example, each TRP may configure reference signal transmission to the UE 104, which may be via radio resource control (RRC) configuration, media access control (MAC)-control element (CE), broadcast system information, etc. In an example, each TRP may configure CSI-RS transmission, TRS transmission, SSB transmission, etc. RS determining component 252 can receive the configurations from multiple TRPs and can accordingly determine resources (e.g., time and/or frequency resources) over which to receive the downlink reference signals from the TRPs. In an example, the TRPs may transmit the same or similar or different downlink reference signals (e.g., in the same or similar or different time and/or frequency). The UE 104 can be configured to receive the downlink reference signals from the multiple TRPs. In an aspect, a base station 102 or other network component can control the TRPs (e.g., TRPs 140, 142) to transmit the downlink reference signals and/or to transmit the corresponding downlink reference signal configurations.

In one specific example, a TRP can configure a periodic TRS (P-TRS), which can include a CSI-RS resource set for tracking configured in RRC with a semi-statically configured TCI state. The QCL source of the P-TRS can be an SSB for Type-C/D, SSB for Type-C, or CSI-RS for beam management (BM) for Type-D. In another specific example, a TRP can configure an aperiodic TRS (A-TRS) associated with P-TRS. In this example, the TRP can use a DCI-triggered CSI-RS resource set for tracking, which can be initially configured in RRC with a configured TCI state. In this example, the TCI state to use can be triggered by DCI indicating one or more RRC-configured TCI states. The QCL source of the A-TRS can be another P-TRS for Type A/D. In one example, determination of the QCL source can be as defined in 3GPP TS 38.214, section 5.1.5. In addition, for example, A-TRS can be triggered in an UL DCI with different associated SSB (or CSI-RS for BM) as a QCL source type C/D. In this example, each of multiple codepoints in the DCI can point to an A-TRS trigger state that indicates a CSI report index, a non-zero power CSI-RS resource set over which to measure the CSI-RS, and QCL information for the SSB, and the UL DCI can indicate the CSI report index to use in determining the QCL source.

In one example, where the GC-DCI, e.g., as received at Block 402, includes A-TRS triggering only, GC-DCI can include the set of blocks, where each block can be received by multiple UEs. Each block may contain one or more bits that selects one of the configured A-TRS (e.g., as configured in RRC signaling) for the UE. GC-DCI processing component 254, in this example, can determine, and/or RS determining component 252 can receive, the subset of the set of blocks that correspond to the UE for receiving the corresponding one or more downlink reference signals indicated for the subset of the set of blocks.

In another example, where the GC-DCI includes A-SRS and A-TRS triggering, separate codepoints in each block can be used for indicating A-SRS and A-TRS. For example, the GC-DCI can include a first codepoint (e.g., 2-bits) to indicate A-SRS and a second codepoint (e.g., another 2-bits and/or a subsequent or preceding 2-bits of the first codepoint) to indicate A-TRS. In one specific example, an SRS block can be indicated followed by a corresponding TRS block followed by the next SRS block, etc., such that the SRS blocks and TRS blocks are interleaved in the set of blocks indicated in the GC-DCI. In this example, GC-DCI processing component 254 can determine which codepoints and/or associated blocks correspond to the UE 104, which may include determining, e.g., in bit order, a SRS block and the next TRS block or determining the TRS block and the preceding SRS block, etc. In another specific example, multiple (e.g., all) SRS blocks can be indicated in a first set of consecutive blocks and multiple (e.g., all) TRS blocks can be indicated in a second set of consecutive blocks following the first set of consecutive blocks in the set of blocks. In this example, GC-DCI processing component 254 can determine which codepoints and/or associated blocks correspond to the UE 104, which may include determining a SRS block and a TRS block having a similar index (e.g., a similar offset from a starting codepoint) among the various TRS blocks as the SRS block among the various SRS blocks. In any case, RS determining component 252 can receive the downlink reference signals (e.g., the TRS) based on configured TRS resources corresponding to the codepoint indicated in the block (e.g., as defined in a configuration that maps codepoints to TRS resources).

In another example, where the GC-DCI includes A-SRS and A-TRS triggering, a joint codepoint can be used to trigger A-SRS and an A-TRS. In this example, the codepoints for each block can indicate a A-SRS and an A-TRS, and GC-DCI processing component 254 can determine the codepoint that applies to the UE 104 and can accordingly determine the A-SRS and A-TRS indicated for the codepoint. For example, one block with Xbits can trigger both SRS and A-TRS. In this example, RS determining component 252 can determine the A-TRS resources that correspond to the codepoint indicated in the block (e.g., based on a separate configuration that maps codepoints to A-TRS resource indications, as described) and can receive the downlink reference signals over the determined resources. In another example, as described further herein, RS determining component 252 can similarly determine the A-SRS resources that correspond to the codepoint indicated in the block, and can transmit SRS over the A-SRS resources.

In yet another example, the GC-DCI can include A-SRS triggering, and associations between A-SRS and A-TRS can be provided in a separate configuration (e.g., RRC signaling, MAC-CE, or system information broadcast received from the network). In this example, optionally at Block 410, a configuration indicating associations between downlink reference signals and SRSs can be received (e.g., from the base station 102 or network component). In this example, a single A-SRS configuration can be provided (e.g., as in DCI Format 2-3), which can be associated with a A-TRS (by RRC, MAC-CE, system information, or other configuration), such that the UE 104 can trigger A-TRS reception and A-SRS transmission. In this example, one block triggers A-SRS, which then results in triggering the A-TRS (e.g., based on the configuration received at Block 410). In this example, RS determining component 252 can receive the downlink reference signals (e.g., the determined A-TRS). In addition, in this example, the A-SRS triggering can be used by legacy UEs without determining the corresponding A-TRS configuration. Moreover, in this example, the GC-DCI can reuse SRS request bits defined in DCI format 2_3 to indicate A-SRS, and to select the SRS resource set for the UE 104.

In addition, the first CC, second CC, and a third CC may all be the same CC, such that the reference signal, the GC-DCI, and the UL SRS are all transmitted on the same CC. In other examples, one or more of the first CC, second CC, and/or third CC can be different.

In addition, for example and as described above, RS determining component 252, e.g., via communicating component 242, can receive the one or more downlink reference signals determined based on the GC-DCI. For example, RS determining component 252 can determine resources (e.g., time and/or frequency resources) over which the one or more downlink reference signals are transmitted, which may be based on the GC-DCI indication of the downlink reference signal(s) for the UE (e.g., an identifier of the downlink reference signal(s)), information regarding the downlink reference signals received in another configuration (e.g., associating identifiers to resources), etc. RS determining component 252 can accordingly receive the one or more downlink reference signals over determined resources.

In method 400, optionally at Block 414, one or more uplink SRSs can be transmitted, to the network, for each block of the subset of blocks, and based on the one or more downlink reference signals. In an aspect, communicating component 242, e.g., in conjunction with processor(s) 212, memory 216, transceiver 202, etc., can transmit, to the network, for each block of the subset of the set of blocks and based on the one or more downlink reference signals, the one or more uplink SRSs. For example, communicating component 242 can transmit the A-SRS determined to correspond to the one or more downlink reference signals (e.g., one or more A-TRSs). For example, the A-SRS can be determined as indicated in the GC-DCI, in a separate configuration associating A-TRSs to A-SRSs, etc., as described. In an example, communicating component 242 can determine resources (e.g., time and/or frequency resources) defined for the A-SRS, which may be defined in a separate configuration based on an identifier of the A-SRS. In this example, the GC-DCI may indicate the identifier of the A-SRS for the UE 104, and communicating component 242 can determine the resources and/or other parameters for transmitting the A-SRS based on the identifier.

In one example in method 400, optionally at Block 416, a timing offset between receiving the one or more downlink reference signals and transmitting the one or more uplink SRSs can be determined. In an aspect, RS determining component 252, e.g., in conjunction with processor(s) 212, memory 216, transceiver 202, communicating component 242, etc., can determine the timing offset between receiving the one or more downlink reference signals and transmitting the one or more uplink SRS. For example, the network can configure the timing offset (e.g., via base station 102 and/or one or more TRPs 140, 142). In an example, when an A-SRS and A-TRS are triggered, a separate slot offset may be configured for each UL and DL signal, or the same slot offset may be used. A minimum gap between the A-TRS and the A-SRS may be configured or specified. It may be UE capability how much time the UE needs after it receives the A-TRS, to transmit an A-SRS that uses the Doppler shift that was derived using the A-TRS. In this example, communicating component 242 may indicate the capability to the base station 102 or network component. In an example, the A-TRS can be received first, and the A-SRS can be configured later. The A-SRS offset may be defined relative to its associated A-TRS, such that the RS determining component 252 can determine the offset for transmitting the A-SRS based on the offset and the time the A-TRS is received.

FIG. 5 illustrates a flow chart of an example of a method 500 for indicating one or more of multiple downlink reference signals to use in transmitting one or more uplink signals, in accordance with aspects described herein. In an example, a base station 102 or other network component that can communicate with multiple TRPs (e.g., TRPs 140, 142) can perform the functions described in method 500 using one or more of the components described in FIGS. 1 and 3.

In method 500, at Block 502, multiple downlink reference signals can be transmitted, to a UE, using multiple TRPs. In an aspect, configuring component 342, e.g., in conjunction with processor(s) 312, memory 316, transceiver 302, etc., can transmit, to the UE (e.g., UE 104), the multiple downlink reference signals using multiple TRPs, such as TRPs 140, 142. For example, configuring component 342 can cause the TRPs 140, 142 to transmit downlink reference signals, which may include CSI-RS, TRS, SSB, etc. In addition, for example, configuring component 342 can configure UEs to receive the downlink reference signal based on one or more parameters transmitted in a configuration via RRC signaling, system information broadcast, etc. For example, configuring component 342 can transmit, e.g., via each TRP 140, 142, a configuration indicating QCL assumptions (e.g., TCI states) for each TRP for DMRS of PDSCH and PDCCH, such that the UE 104 can use the indicated QCL reference signal sources (e.g., CSI-RS, TRS, SSB, etc.) to know and/or estimate the Doppler shift of each TRP and/or a corresponding Rx beam for receiving the reference signals.

In method 500, at Block 504, a GC-DCI in a first CC that includes a set of blocks intended for one or more UEs can be transmitted to the UE via at least one of the multiple TRPs. In an aspect, GC-DCI component 352, e.g., in conjunction with processor(s) 312, memory 316, transceiver 302, configuring component 342, etc., can transmit, to the UE via at least one of the multiple TRPs, the GC-DCI in the first CC that includes the set of blocks intended for one or more UEs. For example, as described, the GC-DCI can generate the GC DCI to at least one of indicate A-TRSs configured for a group of UEs or indicate A-SRSs corresponding to the A-TRSs. For example, GC-DCI component 352 can generate the GC-DCI to indicate blocks for each codepoint in the DCI, where each block can indicate either only A-TRSs, or can indicate alternating sets of A-TRS and A-SRS, or can indicate multiple (e.g., all) A-SRS first and then multiple (e.g., all) A-TRS, etc., as described above. In yet another example, each codepoint can correspond to a block that indicates both the A-SRS and associated A-TRS (e.g., where the blocks can be RRC configured to indicate the A-SRS and A-TRS resources). Moreover, in an example, GC-DCI component 352 can scramble the GC-DCI with a specific RNTI configured for the UE 104, which the UE 104 can use to descramble the GC-DCI that is intended for the UE 104. Successful descrambling of the GC-DCI can indicate that the GC-DCI is intended for the UE 104. Configuring component 342 may also configure the UE 104 with a pointer that indicates which block of the GC-DCI is intended for this UE 104.

In another example, optionally at Block 506, a configuration indicating associations between downlink reference signals and SRSs can be transmitted. In an aspect, configuring component 342, e.g., in conjunction with processor(s) 312, memory 316, transceiver 302, etc., can transmit the configuration indicating associations between downlink reference signals and SRSs. In this example, GC-DCI component 352 can generate the GC-DCI to indicate A-SRS, and the configuration can be used (e.g., by a UE 104) to determine the A-TRS associated with the A-SRS. In addition, the configuration can be transmitted via RRC signaling, MAC-CE, system information, etc., as described.

In method 500, at Block 508, one or more of the multiple downlink reference signals can be transmitted in a second CC. In an aspect, configuring component 342, e.g., in conjunction with processor(s) 312, memory 316, transceiver 302, etc., can transmit, in the second CC, the one or more of the multiple downlink reference signals. For example, configuring component 342 can transmit the one or more of the multiple downlink reference signals based on determining time and/or frequency resources over which to transmit the one or more of the multiple downlink reference signals. For example, this can include determining the resources as indicated in another configuration associating an index of the downlink reference signals to the resources. In an example, this can be a configuration transmitted to the UE 104 to configure possible A-TRSs for transmitting thereto, possible A-SRSs for receiving therefrom, etc. In addition, for example, the configuration can identify the A-TRS and/or A-SRS configurations, associate the identified configurations with a codepoint, etc. In addition, configuring component 342 can transmit the downlink reference signals via one or more of the TRPs 140, 142.

In method 500, optionally at Block 510, one or more uplink SRSs can be received from the UE, on a third CC, for a given block of the set of blocks, and based on the downlink reference signal associated with the given block of the set of blocks. In an aspect, configuring component 342, e.g., in conjunction with processor(s) 312, memory 316, transceiver 302, etc., can receive, from the UE, on the third CC, for a given block of the set of blocks, and based on the downlink reference signal associated with the given block of the set of blocks, the one or more uplink SRSs. For example, the one or more uplink SRSs can be as associated with the one or more downlink reference signals in the GC-DCI and/or other configurations, as described above.

In addition, in an example, optionally at Block 512, an indication of a timing offset between receiving the one or more downlink reference signals and transmitting the one or more uplink SRSs can be transmitted to the UE. In an aspect, configuring component 342, e.g., in conjunction with processor(s) 312, memory 316, transceiver 302, etc., can transmit, to the UE, the indication of the timing offset between receiving the one or more downlink reference signals and transmitting the one or more uplink SRSs. For example, configuring component 342 can indicate the timing offset in another configuration (e.g., RRC, system information, etc.). In addition, for example, configuring component 342 can receive the one or more uplink SRSs based on the timing offset from transmitting the associated downlink reference signal(s).

In method 500, optionally at Block 514, the one or more uplink SRSs can be processed based on the indicated one or more downlink reference signals. In an aspect, uplink signal processing component 354, e.g., in conjunction with processor(s) 312, memory 316, transceiver 302, configuring component 342, etc., can process the one or more uplink SRSs based on the indicated one or more downlink reference signals. For example, uplink signal processing component 354 can determine the one or more downlink reference signals associated with the transmitted one or more uplink SRSs, and can accordingly determine one or more parameters for subsequent transmissions based on this information (e.g., based on measured signal parameters of the one or more uplink SRSs and/or based on known parameters of the indicated one or more downlink reference signals).

In processing the uplink signal at Block 514, optionally at Block 516, a subsequent downlink signal, transmitted to the UE, can be pre-compensated to account for Doppler shift based on the one or more uplink SRSs. In an aspect, uplink signal processing component 354, e.g., in conjunction with processor(s) 312, memory 316, transceiver 302, configuring component 342, etc., can process the uplink signal such to pre-compensate the subsequent downlink signal, transmitted to the UE, to account for Doppler shift based on the one or more uplink SRSs. In an example, uplink signal processing component 354 can determine the Doppler shift associated with the one or more uplink SRSs, and can, based also on the one or more downlink reference signals, pre-compensate signals at the appropriate TRP to account for the Doppler shift.

In another example in processing the uplink signal at Block 514, optionally at Block 518, a beam can be selected based on at least one of the one or more uplink SRSs or the one or more downlink reference signals. In an aspect, uplink signal processing component 354, e.g., in conjunction with processor(s) 312, memory 316, transceiver 302, configuring component 342, etc., can select the beam based on at least one of the one or more uplink SRSs or the one or more downlink reference signals. For example, uplink signal processing component 354 can process the one or more uplink SRSs to determine and/or indicate a receive beam or transmit beam corresponding to the selected one or more downlink reference signals, a QCL-Type of the one or more downlink reference signals, etc.

Figure 6:
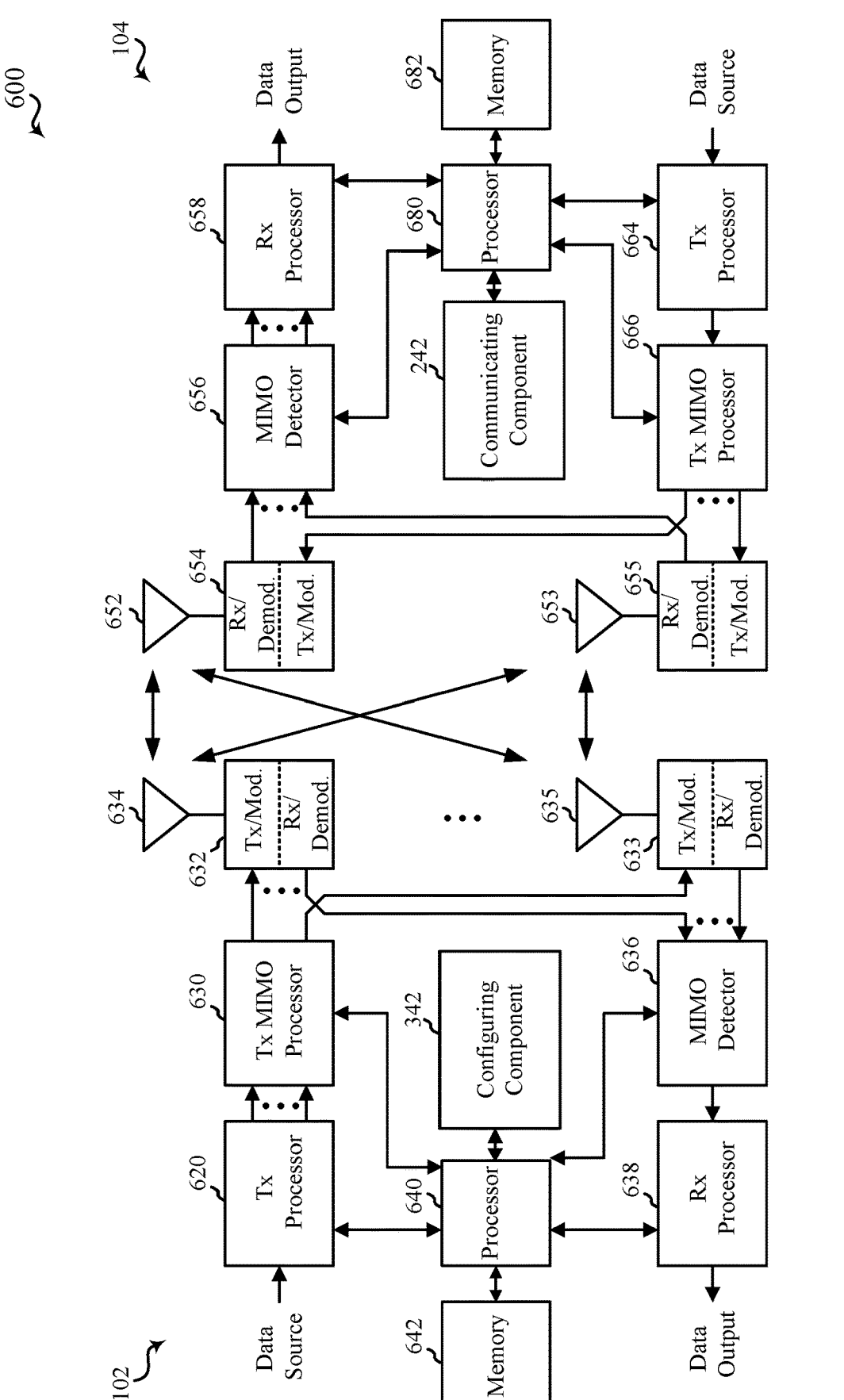
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network described in conjunction with the wireless communication system 100 with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communications by a UE including determining multiple downlink reference signals transmitted by a network via multiple TRPs, receiving, from the network via at least one of the multiple TRPs, a GC-DCI in a first CC that includes a set of blocks intended for one or more UEs, determining a subset of the set of blocks that are intended for the UE, determining, based at least in part on the GC-DCI and the subset of the set of blocks, one or more downlink reference signals of the multiple downlink reference signals for reception in a second CC, associated with each block of the subset of the set of blocks, based on which to transmit one or more uplink SRSs on a third CC, and receiving the one or more downlink reference signals for each block of the subset of the set of blocks.

In Aspect 2, the method of Aspect 1 includes where at least a first portion of the subset of the set of blocks each indicate one of the multiple downlink reference signals based on which to transmit an associated uplink SRS, where transmitting the one or more uplink SRSs includes determining the one or more uplink SRSs associated with the one or more downlink reference signals indicated for the given block.

In Aspect 3, the method of Aspect 2 includes where a second portion of the subset of the set of blocks each indicate one of multiple uplink SRSs to transmit for a corresponding downlink reference signal in the first portion of the subset of the set of blocks, and where transmitting the one or more uplink SRSs includes determining the one or more uplink SRSs from one of the second portion of the subset of the set of blocks determined as associated with the given block of the first portion of the subset of the set of blocks.

In Aspect 4, the method of Aspect 3 includes where the first portion of the subset of the set of blocks and the second portion of the subset of the set of blocks are interleaved in the set of blocks.

In Aspect 5, the method of any of Aspects 3 or 4 includes where the second portion of the subset of the set of blocks includes a first consecutive portion of the subset of the set of blocks, and where the second portion of the subset of the set of blocks includes a second consecutive portion of the subset of the set of blocks that are subsequent to the first consecutive portion.

In Aspect 6, the method of any of Aspects 1 to 5 includes where the subset of the set of blocks each indicate one of the multiple downlink reference signals and one of multiple uplink SRSs to transmit for the one of the multiple downlink reference signals, and where transmitting the one or more uplink SRSs includes determining the one of the multiple uplink SRSs from the given block of the subset of the set of blocks indicated as associated with the one or more downlink reference signals.

In Aspect 7, the method of any of Aspects 1 to 6 includes where the subset of the set of blocks each indicate one of multiple SRSs to transmit, and receiving, from the network, a configuration indicating the multiple downlink reference signals as associated with the multiple SRSs, and where determining the one or more downlink reference signals is based at least in part on determining the one or more downlink reference signals associated with the one of the multiple SRSs indicated for the given block in the configuration.

In Aspect 8, the method of Aspect 7 includes where receiving the configuration includes receiving the configuration in a RRC signaling or a MAC-CE.

In Aspect 9, the method of any of Aspects 7 or 8 includes where the one of the multiple SRSs to transmit are indicated in a SRS request field of each of the set of blocks.

In Aspect 10, the method of any of Aspects 1 to 9 includes determining a timing offset between receiving the one or more downlink reference signals and transmitting the one or more uplink SRSs, where transmitting the one or more uplink SRSs is based on the timing offset.

In Aspect 11, the method of Aspect 10 includes where determining the timing offset is based on receiving, from the network, an indication of the timing offset.

In Aspect 12, the method of Aspect 11 includes where the timing offset is relative to receiving the one or more downlink reference signals.

In Aspect 13, the method of any of Aspects 10 to 12 includes where determining the timing offset is based on transmitting, to the network, a capability indication related to the timing offset.

In Aspect 14, the method of any of Aspects 1 to 13 includes where the first CC, the second CC, and the third CC are different CCs.

In Aspect 15, the method of any of Aspects 1 to 14 includes where the first CC, the second CC, and the third CC are the same CC.

In Aspect 16, the method of any of Aspects 1 to 15 includes where the GC-DCI triggers transmitting the one or more uplink SRSs.

In Aspect 17, the method of any of Aspects 1 to 16 includes transmitting, to the network, for each block of the subset of the set of blocks, and based on the one or more downlink reference signals, the one or more uplink SRSs.

Aspect 18 is a method for wireless communications including transmitting, to a UE, multiple downlink reference signals using multiple TRPs, transmitting, to the UE via at least one of the multiple TRPs, a GC-DCI in a first CC that includes a set of blocks for a group of multiple UEs, where a downlink reference signal of the multiple downlink reference signals is associated with a given block of the set of blocks, transmitting, in a second CC, one or more of the multiple downlink reference signals, and receiving, from the UE, on a third CC, for the given block of the set of blocks, and based on the downlink reference signal associated with the given block of the set of blocks, one or more uplink SRSs.

In Aspect 19, the method of Aspect 18 includes where at least a first portion of a subset of the set of blocks intended for the UE each indicate one of the multiple downlink reference signals based on which to transmit an associated uplink SRS, where receiving the one or more uplink SRSs includes receiving the one or more uplink SRSs associated with the downlink reference signal indicated for the given block.

In Aspect 20, the method of Aspect 19 includes where a second portion of the subset of the set of blocks intended for the UE each indicate one of multiple uplink SRSs to transmit for a corresponding downlink reference signal in the first subset of the set of blocks, and where receiving the one or more uplink SRSs includes receiving the one or more uplink SRSs from one of the second subset of the set of blocks indicated as associated with the given block of the first subset of the set of blocks.

In Aspect 21, the method of Aspect 20 includes where the first portion of the subset of the set of blocks and the second portion of the subset of the set of blocks are interleaved in the subset of the set of blocks.

In Aspect 22, the method of any of Aspects 20 to 21 includes where the second portion of the subset of the set of blocks includes a first consecutive portion of the subset of the set of blocks, and where the second portion of the subset of the set of blocks includes a second consecutive portion of the subset of the set of blocks that are subsequent to the first consecutive portion.

In Aspect 23, the method of any of Aspects 18 to 22 includes where the set of blocks each indicate one of the multiple downlink reference signals and one of multiple uplink SRSs to transmit for the one of the multiple downlink reference signals, and where receiving the one or more uplink SRSs includes receiving the one of the multiple uplink SRSs from the given block of the set of blocks indicated as associated with the downlink reference signal.

In Aspect 24, the method of any of Aspects 18 to 23 includes where the set of blocks each indicate one of multiple SRSs to transmit, and transmitting, to the UE, a configuration indicating the multiple downlink reference signals as associated with the multiple SRSs, and where receiving the downlink reference signal includes receiving the downlink reference signal associated with the one of the multiple SRSs indicated for the given block in the configuration.

In Aspect 25, the method of Aspect 24 includes where transmitting the configuration includes transmitting the configuration in a RRC signaling or a MAC-CE.

In Aspect 26, the method of Aspect 25 includes where the one of the multiple SRSs to transmit are indicated in a SRS request field of each of the set of blocks.

In Aspect 27, the method of any of Aspects 18 to 26 includes transmitting, to the UE, an indication of a timing offset to apply between receiving the downlink reference signal and transmitting the one or more uplink SRSs.

In Aspect 28, the method of Aspect 27 includes where the timing offset is relative to receiving the downlink reference signal.

In Aspect 29, the method of any of Aspects 27 or 28 includes determining the timing offset based on receiving, from the UE, a capability indication related to the timing offset.

In Aspect 30, the method of any of Aspects 18 to 29 includes where the first CC, the second CC, and the third CC are different CCs.

In Aspect 31, the method of any of Aspects 18 to 30 includes where the first CC, the second CC, and the third CC are the same CC.

In Aspect 32, the method of any of Aspects 18 to 31 includes where the GC-DCI triggers transmitting the one or more uplink SRSs.

Aspect 33 is a method for wireless communications by a UE including receiving, from a network via at least one of multiple TRPs, a GC-DCI in a first CC that includes a set of blocks intended for one or more UEs, and receiving, based at least in part on the GC-DCI and a subset of the set of blocks that are intended for the UE, one or more downlink reference signals of multiple downlink reference signals over resources in a second CC, where the one or more downlink reference signals are associated with each block of the subset of the set of blocks.

In Aspect 34, the method of Aspect 33 includes where at least a first portion of the subset of the set of blocks each indicate one of the multiple downlink reference signals based on which to transmit an associated uplink SRS, and transmitting, for each of the multiple downlink reference signals indicated in the subset of the set of blocks, the associated uplink SRS on a third CC.

In Aspect 35, the method of Aspect 34 includes where a second portion of the subset of the set of blocks each indicate one of multiple uplink SRSs to transmit for a corresponding downlink reference signal in the first portion of the subset of the set of blocks, and transmitting the multiple uplink SRSs on a third CC.

In Aspect 36, the method of Aspect 35 includes where the first portion of the subset of the set of blocks and the second portion of the subset of the set of blocks are interleaved in the set of blocks.

In Aspect 37, the method of any of Aspects 34 or 35 includes where the second portion of the subset of the set of blocks includes a first consecutive portion of the subset of the set of blocks, and where the second portion of the subset of the set of blocks includes a second consecutive portion of the subset of the set of blocks that are subsequent to the first consecutive portion.

In Aspect 38, the method of any of Aspects 33 to 37 includes where each block in the subset of the set of blocks indicates one of the multiple downlink reference signals and one of multiple uplink SRSs to transmit for the one of the multiple downlink reference signals, and transmitting the one of multiple uplink SRSs, indicated for each block in the subset of the set of blocks, in a third CC.

In Aspect, 39, the method of any of Aspects 33 to 38 includes where each block in the subset of the set of blocks indicates one of multiple SRSs to transmit, receiving, from the network, a configuration indicating the multiple downlink reference signals as associated with the multiple SRSs, and determining the one or more downlink reference signals based at least in part on determining the one or more downlink reference signals associated with the one of the multiple SRSs indicated a the given block in the configuration.

In Aspect 40, the method of Aspect 39 includes where receiving the configuration includes receiving the configuration in a RRC signaling or a MAC-CE.

In Aspect 41, the method of any of Aspects 39 or 40 includes where one of the multiple SRSs to transmit are indicated in a SRS request field of each of the set of blocks.

In Aspect 42, the method of any of Aspects 33 to 41 includes determining a timing offset between receiving the one or more downlink reference signals and transmitting one or more uplink SRSs, and transmitting the one or more uplink SRSs based on the timing offset.

In Aspect 43, the method of Aspect 42 includes where determining the timing offset is based on receiving, from the network, an indication of the timing offset.

In Aspect 44, the method of Aspect 43 includes where the timing offset is relative to receiving the one or more downlink reference signals.

In Aspect 45, the method of any of Aspects 42 or 43 includes where determining the timing offset is based on transmitting, to the network, a capability indication related to the timing offset.

In Aspect 46, the method of any of Aspects 33 to 45 includes where at least the first CC and the second CC are different CCs.

In Aspect 47, the method of any of Aspects 33 to 46 includes transmitting, based on the one or more downlink reference signals, one or more SRSs on a third CC, where the first CC, the second CC, and the third CC are the same CC.

In Aspect 48, the method of any of Aspects 33 to 47 includes where the GC-DCI triggers transmitting one or more uplink SRSs.

In Aspect 49, the method of any of Aspects 33 to 48 includes transmitting, to the network, for each block of the subset of the set of blocks, and based on one or more downlink reference signals, the one or more uplink SRSs.

Aspect 50 is a method for wireless communications including transmitting, to a UE, multiple downlink reference signals using multiple TRPs, transmitting, to the UE via at least one of the multiple TRPs, a GC-DCI in a first CC that includes a set of blocks for a group of multiple UEs, where a downlink reference signal of the multiple downlink reference signals is associated with a given block of the set of blocks, and transmitting, in a second CC, one or more of the multiple downlink reference signals.

In Aspect 51, the method of Aspect 50 includes where at least a first portion of a subset of the set of blocks intended for the UE each indicate one of the multiple downlink reference signals based on which to transmit an associated uplink SRS, and receiving, for each of the multiple downlink reference signals indicated in the subset of the set of blocks, the associated the associated uplink SRS on a third CC.

In Aspect 52, the method of Aspect 51 includes where a second portion of the subset of the set of blocks intended for the UE each indicate one of multiple uplink SRSs to transmit for a corresponding downlink reference signal in the first subset of the set of blocks, and receiving the multiple uplink SRSs on a third CC.

In Aspect 53, the method of Aspect 52 includes where the first portion of the subset of the set of blocks and the second portion of the subset of the set of blocks are interleaved in the subset of the set of blocks.

In Aspect 54, the method of any of Aspects 52 or 53 includes where the second portion of the subset of the set of blocks includes a first consecutive portion of the subset of the set of blocks, and where the second portion of the subset of the set of blocks includes a second consecutive portion of the subset of the set of blocks that are subsequent to the first consecutive portion.

In Aspect 55, the method of any of Aspects 50 to 54 includes where each block in the set of blocks indicates one of the multiple downlink reference signals and one of multiple uplink SRSs to transmit for the one of the multiple downlink reference signals, and receiving the one of multiple uplink SRSs, indicated for each block in the set of blocks, in a third CC.

In Aspect 56, the method of any of Aspects 50 to 55 includes where each block in the set of blocks indicates one of multiple SRSs to transmit, transmitting, to the UE, a configuration indicating the multiple downlink reference signals as associated with the multiple SRSs, and receiving the downlink reference signal includes receiving the downlink reference signal associated with the one of the multiple SRSs indicated for the given block in the configuration.

In Aspect 57, the method of Aspect 56 includes where transmitting the configuration includes transmitting the configuration in a RRC signaling or a MAC-CE.

In Aspect 58, the method of Aspect 57 includes where the one of the multiple SRSs to transmit are indicated in a SRS request field of each of the set of blocks.

In Aspect 59, the method of any of Aspects 50 to 58 includes transmitting, to the UE, an indication of a timing offset to apply between receiving the downlink reference signal and transmitting one or more uplink SRSs.

In Aspect 60, the method of Aspect 59 includes where the timing offset is relative to receiving the downlink reference signal.

In Aspect 61, the method of any of Aspects 59 or 60 includes determining the timing offset based on receiving, from the UE, a capability indication related to the timing offset.

In Aspect 62, the method of any of Aspects 50 to 61 includes where at least the first CC and the second CC are different CCs.

In Aspect 63, the method of any of Aspects 50 to 62 includes receiving, based on the one or more downlink reference signals, one or more SRSs on a third CC, where the first CC, the second CC, and the third CC are the same CC.

In Aspect 64, the method of any of Aspects 50 to 63 includes where the GC-DCI triggers transmitting one or more uplink SRSs.

Aspect 65 is an apparatus for wireless communication including a transceiver, a memory configured to store instructions, and one or more processors communicatively coupled with the memory and the transceiver, where the one or more processors are configured to perform one or more of the methods of any of Aspects 1 to 64.

Aspect 66 is an apparatus for wireless communication including means for performing one or more of the methods of any of Aspects 1 to 64.

Aspect 67 is a computer-readable medium, including code executable by one or more processors for wireless communications, the code including code for performing one or more of the methods of any of Aspects 1 to 64.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive, from a network via at least one of multiple transmission/reception points (TRPs), a group common (GC)-downlink control information (DCI) in a first component carrier (CC), wherein the GC-DCI includes a set of blocks intended for multiple UEs, wherein the set of blocks includes multiple blocks, wherein each block of the multiple blocks indicates a different one of multiple downlink reference signals associated with a different one of the multiple UEs, and wherein the GC-DCI indicates multiple uplink sounding reference signals (SRSs);
receive, based at least in part on the GC-DCI and a subset of the set of blocks that are intended for the apparatus, one or more downlink reference signals of the multiple downlink reference signals over resources in a second CC, wherein the one or more downlink reference signals are associated with each block of the subset of the set of blocks; and
transmit one or more of the multiple uplink SRSs that are associated with the one or more downlink reference signals on a third CC.

2. The apparatus of claim 1, wherein at least a first portion of the subset of the set of blocks each indicate one of the multiple downlink reference signals, and wherein at least a second portion of the subset of the set of blocks each indicate one of the multiple uplink SRSs.

3. The apparatus of claim 2, wherein the GC-DCI indicates a different one of the multiple uplink sounding reference signals (SRSs) associated with a different one of the multiple UEs.

4. The apparatus of claim 2, wherein the first portion of the subset of the set of blocks and the second portion of the subset of the set of blocks are interleaved in the set of blocks.

5. The apparatus of claim 2, wherein the second portion of the subset of the set of blocks includes a first consecutive portion of the subset of the set of blocks, and wherein the second portion of the subset of the set of blocks includes a second consecutive portion of the subset of the set of blocks that are subsequent to the first consecutive portion.

6. The apparatus of claim 1, wherein each block in the subset of the set of blocks indicates one of the multiple downlink reference signals and one of the multiple uplink SRSs associated with the one of the multiple downlink reference signals.

7. The apparatus of claim 1, wherein each block in the subset of the set of blocks indicates one of the multiple uplink SRSs to transmit, and wherein the one or more processors are further configured to execute the instructions to cause the apparatus to:

receive, from the network, a configuration indicating the multiple downlink reference signals as associated with the multiple uplink SRSs, and determine the one or more downlink reference signals based at least in part on determining the one or more downlink reference signals associated with the one of the multiple uplink SRSs indicated for a given block in the configuration.

8. The apparatus of claim 7, wherein the one or more processors are configured to execute the instructions to cause the apparatus to receive the configuration in a radio resource control (RRC) signaling or a media access control (MAC) control element (CE).

9. The apparatus of claim 7, wherein one of the multiple uplink SRSs to transmit are indicated in a SRS request field of each of the set of blocks.

10. The apparatus of claim 1, wherein the one or more processors are further configured to execute the instructions to cause the apparatus to:

determine a timing offset between receiving the one or more downlink reference signals and transmitting the one or more of the multiple uplink SRSs; and transmit the one or more of the multiple uplink SRSs based on the timing offset.

11. The apparatus of claim 10, wherein the one or more processors are configured to execute the instructions to cause the apparatus to determine the timing offset based on receiving, from the network, an indication of the timing offset.

12. The apparatus of claim 11, wherein the timing offset is relative to receiving the one or more downlink reference signals.

13. The apparatus of claim 10, wherein the one or more processors are configured to execute the instructions to cause the apparatus to determine the timing offset based on transmitting, to the network, a capability indication related to the timing offset.

14. The apparatus of claim 1, wherein at least the first CC and the second CC are different CCs.

15. The apparatus of claim 1, wherein the first CC, the second CC, and the third CC are the same CC.

16. The apparatus of claim 1, wherein the GC-DCI triggers transmitting the one or more of the multiple uplink SRSs.

17. The apparatus of claim 1, wherein the one or more processors are further configured to execute the instructions to cause the apparatus to transmit, to the network, for each block of the subset of the set of blocks, and based on the one or more downlink reference signals, the one or more of the multiple uplink SRSs.

18. The apparatus of claim 1, wherein the multiple downlink reference signals are tracking reference signals.

19. An apparatus for wireless communication, comprising:

a transceiver;

a memory configured to store instructions; and one or more processors communicatively coupled with the memory and the transceiver, wherein the one or more processors are configured to execute the instructions to cause the apparatus to:

transmit multiple downlink reference signals using multiple transmission/reception points (TRPs);

transmit, to a user equipment (UE) via at least one of the multiple TRPs, a group common (GC)-downlink control information (DCI) in a first component carrier (CC), wherein the GC-DCI includes a set of blocks for a group of multiple UEs, wherein the set of blocks includes multiple blocks, wherein each block of the multiple blocks indicates a different one of the multiple downlink reference signals associated with a different one of the multiple UEs, and wherein the GC-DCI indicates multiple uplink sounding reference signals (SRSs);

transmit, in a second CC, one or more of the multiple downlink reference signals; and receive, from the UE, one or more of the multiple uplink SRSs that are associated with the one or more downlink reference signals on a third CC.

20. The apparatus of claim 19, wherein at least a first portion of a subset of the set of blocks intended for the UE each indicate one of the multiple downlink reference signals, and wherein at least a second portion of the subset of the set of blocks each indicate one of the multiple uplink SRSs.

21. The apparatus of claim 20, wherein the GC-DCI indicates a different one of the multiple uplink sounding reference signals (SRSs) associated with a different one of the multiple UEs.

22. The apparatus of claim 20, wherein the first portion of the subset of the set of blocks and the second portion of the subset of the set of blocks are interleaved in the subset of the set of blocks.

23. The apparatus of claim 20, wherein the second portion of the subset of the set of blocks includes a first consecutive portion of the subset of the set of blocks, and wherein the second portion of the subset of the set of blocks includes a second consecutive portion of the subset of the set of blocks that are subsequent to the first consecutive portion.

24. The apparatus of claim 19, wherein each block in the set of blocks indicates one of the multiple downlink reference signals and the one of multiple uplink SRSs associated with the one of the multiple downlink reference signals.

25. The apparatus of claim 19, wherein each block in the set of blocks indicates one of the multiple uplink SRSs to transmit, and wherein the one or more processors are further configured to execute the instructions to cause the apparatus to:

transmit, to the UE, a configuration indicating the multiple downlink reference signals as associated with the multiple uplink SRSs; and receive the downlink reference signal includes receiving the downlink reference signal associated with the one of the multiple uplink SRSs indicated for a given block in the configuration.

26. The apparatus of claim 19, further comprising transmitting, to the UE, an indication of a timing offset to apply between receiving the downlink reference signal and transmitting the one or more of the multiple uplink SRSs.

27. The apparatus of claim 19, wherein at least the first CC and the second CC are different CCs.

28. The apparatus of claim 19, wherein the first CC, the second CC, and the third CC are the same CC.

29. A method for wireless communications by a user equipment (UE), comprising:

receiving, from a network via at least one of multiple transmission/reception points (TRPs), a group common (GC)-downlink control information (DCI) in a first component carrier (CC), wherein the GC-DCI includes a set of blocks intended for multiple UEs, wherein the set of blocks includes multiple blocks, wherein each block of the multiple blocks indicates a different one of multiple downlink reference signals associated with a different one of the multiple UEs, and wherein the GC-DCI indicates multiple uplink sounding reference signals (SRSs);

receiving, based at least in part on the GC-DCI and a subset of the set of blocks that are intended for the UE, one or more downlink reference signals of multiple downlink reference signals over resources in a second CC, wherein the one or more downlink reference signals are associated with each block of the subset of the set of blocks; and transmitting one or more of the multiple uplink SRSs that are associated with the one or more downlink reference signals on a third CC.

30. The method of claim 29, wherein at least a first portion of the subset of the set of blocks each indicate one of the multiple downlink reference signals, and wherein at least a second portion of the subset of the set of blocks each indicate one of the multiple uplink SRSs.

31. A method for wireless communications, comprising:

transmitting multiple downlink reference signals using multiple transmission/reception points (TRPs);

transmitting, to a user equipment (UE) via at least one of the multiple TRPs, a group common (GC)-downlink control information (DCI) in a first component carrier (CC), wherein the GC-DCI includes a set of blocks for a group of multiple UEs, wherein the set of blocks includes multiple blocks, wherein each block of the multiple blocks indicates a different one of the multiple downlink reference signals associated with a different one of the multiple UEs, and wherein the GC-DCI indicates multiple uplink sounding reference signals (SRSs);

transmitting, in a second CC, one or more of the multiple downlink reference signals; and receiving, from the UE, one or more of the multiple uplink SRSs that are associated with the one or more downlink reference signals on a third CC.

\* \* \* \* \*